US011575133B2

(12) United States Patent
Fukatani et al.

(10) Patent No.: US 11,575,133 B2
(45) Date of Patent: Feb. 7, 2023

(54) BINDER FOR NON-AQUEOUS ELECTROLYTE RECHARGEABLE BATTERY, NEGATIVE ELECTRODE SLURRY FOR RECHARGEABLE BATTERY INCLUDING THE SAME, NEGATIVE ELECTRODE FOR RECHARGEABLE BATTERY INCLUDING THE SAME, AND RECHARGEABLE BATTERY INCLUDING THE SAME

(71) Applicant: Samsung SDI Co., Ltd., Yongin-si (KR)

(72) Inventors: Tomoyuki Fukatani, Yokohama (JP); Koji Hoshiba, Yokohama (JP); Iwao Fukuchi, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 261 days.

(21) Appl. No.: 16/857,809

(22) Filed: Apr. 24, 2020

(65) Prior Publication Data
US 2020/0343556 A1  Oct. 29, 2020

(30) Foreign Application Priority Data

Apr. 26, 2019 (JP) .............................. JP2019-086616
Apr. 23, 2020 (KR) ......................... 10-2020-0049592

(51) Int. Cl.
*H01M 4/62* (2006.01)
*C08F 220/48* (2006.01)
(Continued)

(52) U.S. Cl.
CPC .......... *H01M 4/622* (2013.01); *C08F 220/48* (2013.01); *C08L 25/14* (2013.01); *C08L 33/02* (2013.01);
(Continued)

(58) Field of Classification Search
None
See application file for complete search history.

(56) References Cited

U.S. PATENT DOCUMENTS 9,620,781 B2   4/2017 Kang et al.
2002/0034686 A1   3/2002 Yamakawa et al.
(Continued)

FOREIGN PATENT DOCUMENTS

CN   104247110 A   12/2014
CN   106663813 A   5/2017
(Continued)

OTHER PUBLICATIONS

Aoki, Shoko, et al., "Acrylic Acid-Based Copolymers as Functional Binder for Silicon/Graphite Composite Electrode in Lithium-Ion Batteries," Journal of the Electrochemical Society, vol. 162, No. 12, 2015, pp. A2245-A2249.
(Continued)

*Primary Examiner* — Wyatt P McConnell
(74) *Attorney, Agent, or Firm* — Lewis Roca Rothgerber Christie LLP

(57) ABSTRACT

An embodiment provides a binder for a non-aqueous electrolyte rechargeable battery including a copolymer (A) and a copolymer (B), wherein the copolymer (A) includes a unit (a-1) derived from a (meth)acrylic acid-based monomer, and a unit (a-2) derived from a (meth)acrylonitrile monomer, and the copolymer (B) includes a unit (b-1) derived from an aromatic vinyl-based monomer; and a unit (b-2) derived from an ethylenic unsaturated monomer which is at least one of an unsaturated carboxylic acid alkylester monomer, a (meth)acrylic acid-based monomer, a unsaturated carboxylic acid amide monomer, or combinations thereof.

15 Claims, 1 Drawing Sheet

(51) Int. Cl.
*C08L 25/14* (2006.01)
*C08L 33/02* (2006.01)
*C08L 33/20* (2006.01)
*H01M 4/131* (2010.01)
*H01M 4/38* (2006.01)
*H01M 10/0525* (2010.01)
*H01M 4/02* (2006.01)

(52) U.S. Cl.
CPC ............. *C08L 33/20* (2013.01); *H01M 4/131* (2013.01); *H01M 4/386* (2013.01); *H01M 10/0525* (2013.01); *H01M 2004/027* (2013.01)

(56) References Cited

U.S. PATENT DOCUMENTS

| | | |
|---|---|---|
| 2011/0003207 A1 | 1/2011 | Oh et al. |
| 2016/0156024 A1 | 6/2016 | Kinpara et al. |
| 2017/0040612 A1 | 2/2017 | Komaba et al. |
| 2017/0062828 A1 | 3/2017 | Sonobe et al. |
| 2017/0244095 A1 | 8/2017 | Sonobe et al. |
| 2017/0256800 A1* | 9/2017 | Kaneda ................. H01M 4/133 |
| 2017/0279123 A1 | 9/2017 | Nakayama et al. |
| 2018/0351177 A1 | 12/2018 | Kang et al. |

FOREIGN PATENT DOCUMENTS

| | | |
|---|---|---|
| CN | 108028379 A | 5/2018 |
| EP | 3 396 750 A1 | 10/2018 |
| JP | 2002-203561 A | 7/2002 |
| JP | 3721727 B2 | 11/2005 |
| JP | 5279047 B2 | 9/2013 |
| JP | WO2015/186363 A1 | 12/2015 |
| JP | 2016-149313 A | 8/2016 |
| JP | WO2016/067633 A1 | 8/2017 |
| JP | WO2018/043200 A1 | 8/2018 |
| JP | 6412689 B2 | 10/2018 |
| WO | WO 2014/207967 A1 | 12/2014 |
| WO | WO 2015/163302 A1 | 10/2015 |
| WO | WO 2016/039067 A1 | 3/2016 |
| WO | WO 2016/170768 A1 | 10/2016 |

OTHER PUBLICATIONS

Kwon, Tae-Woo, et al., "The emerging era of supramolecular polymeric binders in silicon anodes," Chemical Society Reviews, 2018, 20 pages.

EPO Extended European Search Report dated Oct. 8, 2020, issued in corresponding European Patent Application No. 20171413.6 (10 pages).

Office Action dated Nov. 29, 2022 (including a Search Report dated Nov. 22, 2022), of the corresponding Chinese Patent Application No. 202010338122.7, 9pp.

* cited by examiner

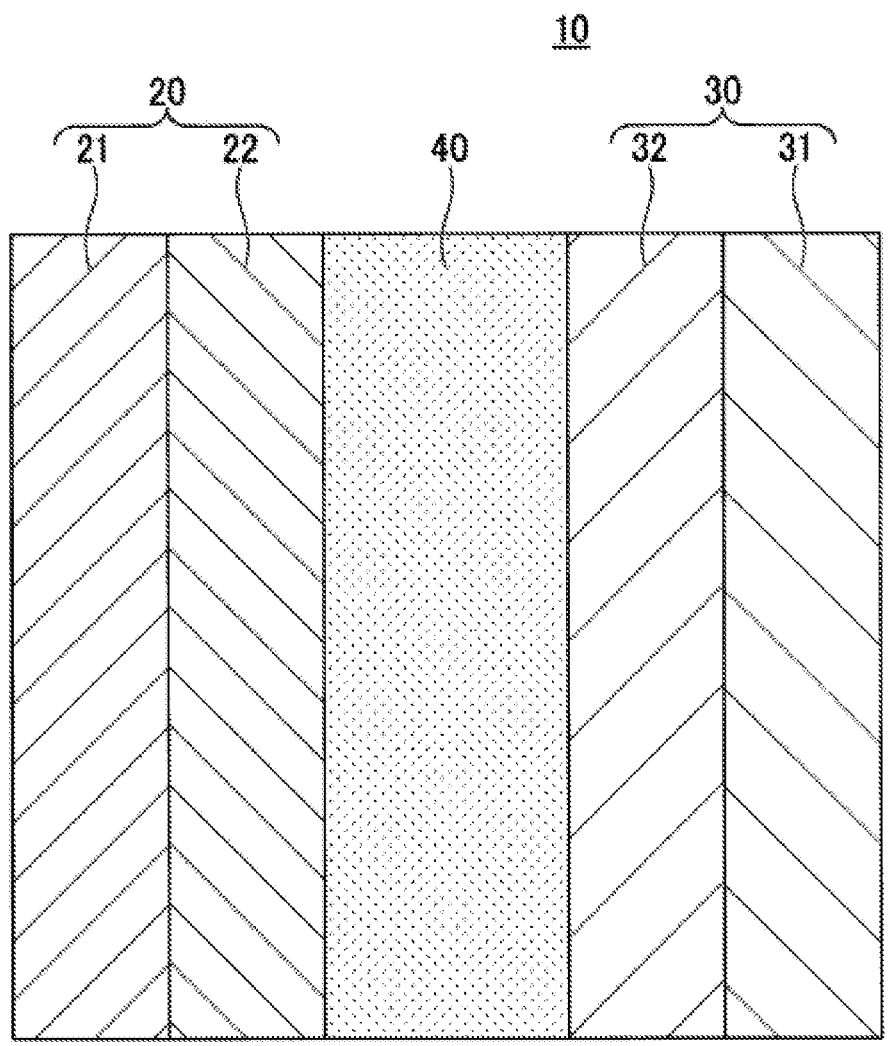

BINDER FOR NON-AQUEOUS ELECTROLYTE RECHARGEABLE BATTERY, NEGATIVE ELECTRODE SLURRY FOR RECHARGEABLE BATTERY INCLUDING THE SAME, NEGATIVE ELECTRODE FOR RECHARGEABLE BATTERY INCLUDING THE SAME, AND RECHARGEABLE BATTERY INCLUDING THE SAME

CROSS-REFERENCE TO RELATED APPLICATION(S)

This application claims priority to and the benefit of Japanese Patent Application No. 2019-086616 filed in the Japan Patent Office on Apr. 26, 2019 and Korean Patent Application No. 10-2020-0049592, filed on Apr. 23, 2020, in the Korean Intellectual Property Office, the entire contents of each of which are incorporated herein by reference.

BACKGROUND

1. Field

Embodiments of the present disclosure relate to a binder for a non-aqueous electrolyte rechargeable battery, a negative electrode slurry for a rechargeable battery, a negative electrode for a rechargeable battery, and a rechargeable battery.

2. Description of the Related Art

Non-aqueous electrolyte rechargeable batteries, such as lithium ion rechargeable batteries, are widely used as power sources for smartphones and notebooks. As the miniaturization and weight reduction of electronic devices progresses, high energy density of rechargeable batteries is desirable. In addition, demand for a non-aqueous electrolyte rechargeable battery as a power source for electric vehicles, hybrid vehicles, and the like is also increasing. Accordingly, high capacity and long cycle-life characteristics are utilized to provide performance approximately equivalent to that of a gasoline engine vehicle.

As an example of a method for increasing capacity of a lithium ion rechargeable battery, an active material including a silicon atom may be used in a negative electrode.

When applying an active material including a silicon atom having a large amount of lithium intercalation/deintercalation (as compared with an existing graphite-based active material), an improvement in battery capacity may be expected. Because the silicon-containing active material has a large volume change accompanying lithium intercalation/deintercalation, however, a negative active material layer substantially (and/or violently) expands and contracts during charging and discharging. As a result, there is a problem in that the electron conductivity between negative active materials may be lowered or a conductive path between a negative active material and a current collector may be blocked, and thus cycle characteristics of a rechargeable battery may be deteriorated.

In order to solve the above-mentioned problems, studies on the negative electrode binder have been conducted (for example, see Patent Documents 1 to 4).

Patent Document 1 (WO2015/163302) discloses that capacity retention rates after 10 cycles of charging and discharging may be improved by using an aqueous solution of a crosslinked sodium polyacrylate copolymer. Sodium polyacrylate has been used as a water-soluble high-strength, high-elasticity binder. By using sodium polyacrylate, it is expected that volume changes accompanying charging and discharging of a battery including a silicon-containing active material is suppressed or reduced and cycle characteristics may be improved. It is believed, however, when using an aqueous solution of a copolymer including sodium polyacrylate as the main component, it is difficult in practical terms to apply the aqueous solution of the copolymer including sodium polyacrylate because cracks are generated in the electrode during the coating and drying processes of the negative electrode slurry.

Patent Document 1 (WO2014/207967) discloses that an aqueous solution of a copolymer of sodium acrylate and vinyl alcohol has been used, and improved cycle characteristics may be exhibited as compared with an existing negative electrode binder (a combination system of carboxymethyl cellulose and styrene butadiene copolymer) when the aqueous solution of the copolymer of sodium acrylate and vinyl alcohol is used. It is believed, however, in the case of such a binder, there was no problem of crack generation in the process of coating and drying the negative electrode slurry, but it has been confirmed that cycle improvement effects are not sufficient or desirable when such a binder is used.

In Patent Document 3 (WO2016/039067) and Patent Document 4 (WO2016/170768), latex of polymer particles have also been proposed as replacements for existing styrene butadiene rubber, but data proving the suppression of expansion of silicon-containing active materials when utilizing such latex of polymer particles has not been obtained. In addition, latex is synthesized by emulsion polymerization using low-molecular weight surfactants, and those surfactants, which may be electrochemically unstable, may be eluted into the electrolyte and mixed in the negative electrode, thereby causing deterioration of cycle performance.

SUMMARY

Embodiments of the present disclosure provide a binder for a non-aqueous electrolyte rechargeable battery, a negative electrode slurry for a rechargeable battery, a negative electrode for a rechargeable battery, and a rechargeable battery using the same, which is capable of suppressing or reducing electrode expansion of the negative electrode even with a small content of the binder and at the same time improving cycle characteristics.

A binder for a non-aqueous electrolyte rechargeable battery according to an embodiment includes a copolymer (A) and a copolymer (B), wherein the copolymer (A) includes a unit (a-1) derived from a (meth)acrylic acid-based monomer and a unit (a-2) derived from a (meth)acrylonitrile monomer, and the copolymer (B) includes a unit (b-1) derived from an aromatic vinyl-based monomer; and a unit (b-2) derived from an ethylenic unsaturated monomer which is at least one of an unsaturated carboxylic acid alkylester monomer, a (meth)acrylic acid-based monomer, a unsaturated carboxylic acid amide monomer, or combinations thereof.

The copolymer (A) may further include a unit (a-3) derived from another monomer copolymerizable with the (meth)acrylic acid-based monomer and/or (meth)acrylonitrile monomer.

The unit (a-1) derived from the (meth)acrylic acid-based monomer may be included in an amount of about 35 wt % to about 65 wt % and the unit (a-2) derived from the (meth)acrylonitrile monomer may be included in an amount of about 35 wt % to about 65 wt %, based on 100 wt % of the copolymer (A).

The unit (a-3) derived from another monomer copolymerizable with the (meth)acrylic acid-based monomer and/or (meth)acrylonitrile monomer may be included in an amount of greater than about 0 wt % and less than or equal to about 20 wt % based on 100 wt % of the copolymer (A).

The binder may have a particle shape. For example, the binder may be included in a plurality of particles.

At least a portion of the copolymer (B) may be surrounded by the copolymer (A).

The copolymer (A) may be included in an amount of greater than or equal to about 50 parts by weight and less than or equal to about 95 parts by weight based on 100 parts by weight of the copolymer (B).

The (meth)acrylic acid-based monomer may be at least one of (meth)acrylic acid, an alkali metal salt of (meth)acrylic acid, an ammonium salt of (meth)acrylic acid, or combinations thereof.

The copolymer (A) may have a viscosity in an aqueous solution having a solid content of about 7 wt % in a range of about 500 mPa·s to about 3000 mPa·s.

The copolymer (B) may have a viscosity in an aqueous solution having a solid content of about 7 wt % in a range of about 500 mPa·s to about 3000 mPa·s.

The unit (b-2) derived from an ethylenic unsaturated monomer may be included in an amount of greater than or equal to about 5 wt % based on 100 wt % of the copolymer (B).

The glass transition temperature of the copolymer (B) may be in a range about 15° C. to about 100° C.

According to an embodiment, a negative electrode slurry for a rechargeable battery includes the binder for the non-aqueous electrolyte rechargeable battery and a negative active material, and the negative active material includes an active material including a silicon atom.

According to an embodiment, a negative electrode for a rechargeable battery includes a current collector and a negative active material layer including the binder for the non-aqueous electrolyte rechargeable battery formed on the current collector.

According to an embodiment, a rechargeable battery having the negative electrode for a rechargeable battery is provided.

BRIEF DESCRIPTION OF THE DRAWING

The accompanying drawing, together with the specification, illustrates an embodiment of the subject matter of the present disclosure, and, together with the description, serves to explain principles of embodiments of the subject matter of the present disclosure.

The accompanying drawing is a side cross-sectional view schematically showing a configuration of a lithium ion rechargeable battery.

DETAILED DESCRIPTION

Hereinafter, embodiments of the present disclosure are described in more detail with reference to the accompanying drawings.

In the present specification and drawings, the same reference numerals are assigned to components having substantially the same functional configuration, and redundant descriptions thereof will not be repeated.

1. Binder for Non-Aqueous Electrolyte Rechargeable Battery

A binder for a non-aqueous electrolyte rechargeable battery according to an embodiment of the present disclosure is described.

The binder for a non-aqueous electrolyte rechargeable battery according to an embodiment may be used to form an electrode (e.g., a negative electrode) for a rechargeable battery.

The binder for a non-aqueous electrolyte rechargeable battery according to an embodiment includes a copolymer (A) and a copolymer (B), wherein the copolymer (A) includes a unit (a-1) derived from a (meth)acrylic acid-based monomer, and a unit (a-2) derived from a (meth)acrylonitrile monomer, and the copolymer (B) includes a unit (b-1) derived from an aromatic vinyl-based monomer; and a unit (b-2) derived from an ethylenic unsaturated monomer which is at least one of an unsaturated carboxylic acid alkylester monomer, a (meth)acrylic acid-based monomer, a unsaturated carboxylic acid amide monomer, or combinations thereof.

The binder for a non-aqueous electrolyte rechargeable battery according to an embodiment may suppress or reduce electrode expansion of the negative electrode even with a small content (e.g., when the binder is included in an amount greater than or equal to about 1 wt % and less than or equal to about 10 wt % based on 100 wt % of the negative electrode for a rechargeable battery) and concurrently (e.g., simultaneously) improving cycle characteristics by including the copolymer (A) and the copolymer (B).

The binder may have a particle shape. For example, the binder may be included in a particle or a plurality of particles. The particle shape is not particularly limited as long as it is suitable for purposes of the present disclosure, and may include a shape such as, for example, a spherical shape or an elliptical shape. In the present specification, the term "spherical" is understood to be a concept that includes not only a perfect spherical shape but also a substantially spherical shape such as, for example, a shape similar to a spherical shape or a rectangular oval shape.

In the binder, at least a portion of the copolymer (B) is surrounded by the copolymer (A). For example, the copolymer (A) may completely or partially surround the portion of the copolymer (B), or the copolymer (A) may completely or partially surround all of the copolymer (B). As described further herein below, the copolymer (B) may be prepared by copolymerizing the copolymer (B) in water and in the presence of a polymer dispersion stabilizer comprising the copolymer (A). Therefore, in some embodiments, the water-insoluble copolymer (B) may be aggregated into the inside of the binder particles, and the water-soluble copolymer (A) surrounds at least a portion or entire portions of the copolymer (B) or the copolymer (B) may be present thereinside. For example, the shape of the core (copolymer (B))-shell (copolymer (A)) may be achieved. In some embodiments, copolymerizing the water-insoluble copolymer (B) in the presence of water and a polymer dispersion stabilizer comprising copolymer (A) causes the copolymer (A) to completely or partially surround the copolymer (B) to form a particle comprising the copolymer (B) in a core and the copolymer (A) in a shell partially or completely surrounding the core.

The binder for a non-aqueous electrolyte rechargeable battery according to an embodiment improves water dispersibility of the copolymer (e.g., the copolymer (B)) and maintains good adhesion between the elements, by having a particle shape in which at least a portion of the copolymer (B) is surrounded by the copolymer (A).

1-1. Copolymer (A)

The copolymer (A) includes a unit (a-1) derived from a (meth)acrylic acid-based monomer, and a unit (a-2) derived from a (meth)acrylonitrile monomer. The unit (a-1) derived from the (meth)acrylic acid-based monomer may be included in an amount of about 35 wt % to about 65 wt % and the unit (a-2) derived from the (meth)acrylonitrile may be included in an amount of about 35 wt % to about 65 wt % based on 100 wt % of the copolymer (A).

In the copolymer (A), when the content (e.g., the amount or weight) of the unit (a-1) derived from the (meth)acrylic acid-based monomer is less than about 35 wt % based on 100 wt % of the copolymer (A), the copolymer (A) may have properties of water insolubility (e.g., the copolymer (A) may not be sufficiently water soluble), which is not desirable, dispersibility of the negative active material may be decreased, and storage stability of the negative electrode slurry may be deteriorated or reduced. In addition, in the copolymer (A), when the content (e.g., the amount or weight) of the unit (a-1) derived from the (meth)acrylic acid-based monomer exceeds about 65 wt % based on 100 wt % of the copolymer (A), cracks may be generated in the electrode during coating and drying of the negative electrode slurry, so it may not be easy to manufacture the negative electrode when the content of the unit (a-1) derived from the (meth)acrylic acid-based monomer exceeds about 65 wt % based on 100 wt % of the copolymer (A).

In the copolymer (A), when the content (e.g., the amount or weight) of the unit (a-2) derived from the (meth)acrylonitrile is less than about 35 wt % based on 100 wt % of the copolymer (A), close contacting properties of the negative electrode material mixture layer with respect to a substrate may be deteriorated or reduced (e.g., the negative electrode mixture layer may not sufficiently adhere to the substrate). In addition, in the copolymer (A), when the content (e.g., the amount or weight) of the unit (a-2) derived from the (meth)acrylonitrile exceeds about 65 wt % based on 100 wt % of the copolymer (A), the copolymer (A) may have properties of water insolubility (e.g., the copolymer (A) may not be sufficiently water soluble), which is not desirable, and dispersibility of the negative active material may be decreased, and storage stability of the negative electrode slurry may be deteriorated or reduced.

The (meth)acrylic acid-based monomer may be at least one of (meth)acrylic acid, an alkali metal salt of (meth)acrylic acid, an ammonium salt of (meth)acrylic acid, or combinations thereof. As used herein, the term "(meth)acrylic acid" refers to acrylic acid or methacrylic acid. Examples of the alkali metal salt of (meth)acrylic acid include sodium acrylate, lithium acrylate, potassium acrylate, calcium acrylate, magnesium acrylate, sodium methacrylate, lithium methacrylate, potassium methacrylate, and calcium methacrylate. In an embodiment, sodium acrylate may be utilized. Examples of the ammonium salt of (meth)acrylic acid include an ammonia neutralized product of (meth)acrylic acid, a monoethanolamine neutralized product, a diethanolamine neutralized product, a hydroxyl amine neutralized product, etc.

The binder for a non-aqueous electrolyte rechargeable battery according to an embodiment may include the above-described (meth)acrylic acid-based monomer, thereby further improving characteristics of a rechargeable battery including the same.

A unit (a-3) derived from another monomer copolymerizable with the (meth)acrylic acid-based monomer and/or the (meth)acrylonitrile monomer may be further included in the binder.

The monomer copolymerizable with the (meth)acrylic acid-based monomer and/or (meth)acrylonitrile monomer may include a hydroxyl group-containing monomer and/or an amide group-containing monomer. The hydroxyl group-containing monomer may include, for example, 2-hydroxyethyl(meth)acrylate, 2-hydroxypropyl(meth)acrylate, 4-hydroxybutyl(meth)acrylate, 2-hydroxyhexyl(meth)acrylate, 6-hydroxyhexyl(meth)acrylate, 8-hydroxyoctyl(meth)acrylate, 10-hydroxydecyl(meth)acrylate, 12-hydroxylauryl (meth)acrylate, (4-hydroxymethylcyclohexyl)methylacrylate, N-methylol(meth)acrylamide, N-hydroxy(meth)acrylamide, vinylalcohol, allylalcohol, 2-hydroxyethylvinylether, 4-hydroxybutylvinylether, diethylene glycolmonovinylether, and/or the like. The amide group-containing monomer may include, for example, acrylamide, methacrylamide, diethyl(meth)acrylamide, N-vinylpyrrolidone, N-vinyl-2-pyrrolidone, N-(meth)acryloyl pyrrolidone, N,N-dimethyl acrylamide, N,N-dimethyl methacrylamide, N,N-diethyl acrylamide, N,N-diethylmethacrylamide, N,N'-methylene bisacrylamide, N,N-dimethyl aminopropylacrylamide, N,N-dimethyl aminopropyl methacrylamide, and/or the like. The unit (a-3) derived from another monomer copolymerizable with the (meth)acrylic acid-based monomer and/or (meth)acrylonitrile monomer may be included in an amount of greater than about 0 wt % and less than or equal to about 20 wt % based on 100 wt % of the copolymer (A). In the copolymer (A), the content of the unit (a-3) derived from another monomer copolymerizable with the (meth)acrylic acid-based monomer and/or (meth)acrylonitrile monomer exceeds 20 wt % based on 100 wt % of the copolymer (A), the effect of suppressing or reducing the electrode expansion of the negative electrode may be lowered or reduced. The copolymer (A) may be a water-soluble copolymer for stabilizing the dispersion of the polymer.

The copolymer (A) may have a viscosity of the aqueous solution having a solid content of about 7 wt % in a range of about 500 mPa·s to about 3000 mPa·s or about 750 mPa·s to about 2500 mPa·s. For example, when the copolymer (A) is included in an aqueous solution having a solid content of about 7 wt %, the aqueous solution or the copolymer (A) may have a viscosity in a range of about 500 mPa·s to about 3000 mPa·s or about 750 mPa·s to about 2500 mPa·s. When the copolymer (A) has a viscosity of the aqueous solution having a solid content of about 7 wt % in a range of greater than or equal to about 500 mPa·s, close contacting properties to the substrate of the negative electrode material mixture layer may be improved (e.g., adhesion of the negative electrode material mixture layer to the substrate). According to embodiments of the disclosure, when the viscosity is less than or equal to about 3000 mPa·s, the electrode active material is suitably or favorably dispersed, thereby obtaining a battery having improved cycle characteristics.

1-2. Copolymer (B)

The copolymer (B) includes a unit (b-1) derived from an aromatic vinyl-based monomer; and a unit (b-2) derived from an ethylenic unsaturated monomer which is at least one of an unsaturated carboxylic acid alkylester monomer, a (meth)acrylic acid-based monomer, a unsaturated carboxylic acid amide monomer, or combinations thereof. The copolymer (A) may be included in the binder in an amount of about 50 parts by weight to about 95 parts by weight or about 60 parts by weight to about 90 parts by weight, based on 100 parts by weight of the copolymer (B). When the content (e.g., amount or weight) of the copolymer (A) is greater than or equal to about 50 parts by weight based on 100 parts by weight of the copolymer (B), the strength and elastic modulus of the binder may be improved and electrode expansion of the negative electrode may be suppressed or reduced. On the other hand, when the content of the copolymer (A) is less than or equal to about 95 parts by weight based on 100 parts by weight of the copolymer (B), flexibility of the binder is improved, and cracks do not occur (or substantially do not occur) in the process of coating and drying the negative electrode slurry, so that it is easy to manufacture the electrode and cycle characteristics of a rechargeable battery including the same may be improved.

Examples of the aromatic vinyl monomer include styrene, a-methylstyrene, methoxy styrene, trifluoromethyl styrene, divinyl benzene, and the like, and in an embodiment styrene may be utilized or desirable.

The ethylenic unsaturated monomer may be at least one of an unsaturated carboxylic acid alkyl ester monomer, a (meth)acrylic acid-based monomer, an unsaturated carboxylic acid amide monomer, or combinations thereof.

The unsaturated carboxylic acid alkyl ester monomer may include, for example, 2-ethylhexyl (meth)acrylate, methyl (meth)acrylate, ethyl (meth)acrylate, n-butyl (meth)acrylate, tert-butyl (meth)acrylate, cyclohexyl (meth)acrylate, lauryl (meth)acrylate, benzyl (meth)acrylate, isobornyl (meth) acrylate, 2-hydroxyethyl (meth)acrylate, 2-hydroxypropyl (meth)acrylate, 4-hydroxy butyl (meth)acrylate, glycidyl (meth)acrylate, and/or the like.

The (meth)acrylic acid-based monomers may include, for example, (meth)acrylic acid, maleic acid, fumaric acid, and/or itaconic acid.

The unsaturated carboxylic acid amide monomer may include, for example, (meth)acrylamide, isopropyl acrylamide, N-methylol acrylamide, N-hydroxy ethylacrylamide, N-hydroxy butylacrylamide, dimethyl acrylamide, diethyl acrylamide, and/or the like.

The copolymer (B) may include the unit (b-2) derived from an ethylenic unsaturated monomer in an amount of greater than or equal to about 5 wt % based on 100% by weight of the copolymer (B).

When the content of the unit (b-2) derived from an ethylenic unsaturated monomer is greater than or equal to about 5 wt % based on 100 wt % of the copolymer (B), flexibility of the binder may be improved, cracks are not generated (or are substantially not generated) in the coating and drying process of the negative electrode slurry and thus it is easy to produce the electrode (e.g., the electrode may be produced without defects), close contacting properties to the substrate of the negative electrode material mixture layer may be improved (e.g., adhesion of the negative electrode material mixture layer to the substrate may be improved), and thus a battery having excellent cycle characteristics may be obtained.

The copolymer (B) may be a water-dispersible copolymer that may be dispersed in water due to the copolymer (A). For example, in some embodiments, the copolymer (B) is not water-dispersible on its own and becomes water-dispersible when at least a portion of the copolymer (B) is surrounded by the copolymer (A).

The copolymer (B) may have a viscosity of the aqueous solution having a solid content of about 7 wt % in a range of about 500 mPa·s to about 3000 mPa·s, or about 750 mPa·s to about 2500 mPa·s. For example, when the copolymer (B) is in an aqueous solution having a solid content of about 7 wt %, the copolymer (B) and/or aqueous solution may have a viscosity in a range of about 500 mPa·s to about 3000 mPa·s, or about 750 mPa·s to about 2500 mPa·s. When the viscosity is greater than or equal to 500 mPa·s, close contacting properties to the substrate of the negative electrode material mixture layer may be improved (e.g., adhesion of the substrate to the negative electrode material mixture layer may be improved). On the other hand, when the viscosity is less than or equal to about 3000 mPa·s, the electrode active material is suitably or satisfactorily dispersed, and a negative electrode having excellent cycle characteristics may be obtained.

A glass transition temperature of the copolymer (B) may be greater than or equal to 15° C. and less than or equal to about 100° C., and, for example, greater than or equal to 20° C. and less than or equal to about 50° C. When the glass transition temperature of the copolymer (B) is greater than or equal to 15° C., swelling resistance of the binder to the electrolyte may be improved. On the other hand, when the glass transition temperature of the copolymer (B) is less than or equal to about 100° C., close contacting properties after a compressing process of the negative electrode may be improved and a battery having excellent cycle characteristics may be obtained.

The content (e.g., amount of weight) of the copolymer (B) in the binder for the non-aqueous electrolyte rechargeable battery may be, for example, greater than or equal to 50 wt % and less than 100 wt % based on a solid content in the binder for the non-aqueous electrolyte rechargeable battery.

As described above, the binder for the non-aqueous electrolyte rechargeable battery may include the copolymer (A) in addition to the copolymer (B). It may also include a thickener such as carboxymethyl cellulose, polyacrylic acid, polyacrylamide, and a binder resin such as styrene-butadiene rubber particles and ethylene-acrylic acid ester particles, in addition to the above-mentioned components.

As described herein, the binder for the non-aqueous electrolyte rechargeable battery according to an embodiment includes the copolymer (A) and the copolymer (B), wherein the copolymer (A) includes a unit (a-1) derived from a (meth)acrylic acid-based monomer, and a unit (a-2) derived from a (meth)acrylonitrile monomer, and the copolymer (B) includes a unit (b-1) derived from an aromatic vinyl-based monomer; and a unit (b-2) derived from an ethylenic unsaturated monomer which is at least one of an unsaturated carboxylic acid alkylester monomer, a (meth)acrylic acid-based monomer, a unsaturated carboxylic acid amide monomer, or combinations thereof.

Accordingly, the electrode expansion of the negative electrode may be suppressed or reduced even with a small content of the binder (e.g., when the binder is present in an amount greater than or equal to about 1 wt % and less than or equal to about 10 wt % based on 100 wt % of the negative electrode for a rechargeable battery), and at the same time, the cycle characteristics of the battery may be improved.

1-3. Method of Preparing Binder for Non-Aqueous Electrolyte Rechargeable Battery A method for preparing embodiments of the binder of the present disclosure may be a general emulsion polymerization method, a soap-free emulsion polymerization method, a seed polymerization method, a method of swelling monomers on seed particles and then conducting polymerization, and/or the like. For example, soap-free emulsion polymerization (SFEP) without a separate emulsifier may be used. In some embodiments, a composition including a (meth)acrylic acid-based monomer and a (meth)acrylonitrile monomer, a polymerization initiator, water, and, as needed or desired, a dispersing agent, a chain transfer agent, and/or a pH adjusting agent at room temperature in a sealed container equipped with a stirrer and a heating device is stirred in an inert gas atmosphere to emulsify it in water. As the emulsifying method, a method such as stirring, shearing, ultrasonication, and/or the like may be applied, and a stirring blade, a homogenizer, and/or the like may be used. Next, by raising a temperature while stirring to start polymerization, the copolymer (A) may be dispersed in water. The method of adding each monomer during polymerization may be a monomer dropping method and/or a pre-emulsion dropping method, etc. in addition to batch injection, and two or more of these methods may be used in combination.

As a method for forming the copolymer (A) around the copolymer (B) of the present disclosure, composite copolymer particles having a structure in which the copolymer (A) surrounds the copolymer (B) may be formed using the copolymer (A) polymerized by the above method as seed particles. For example, the binder may be formed by a method of growing particles by adding an aromatic vinyl monomer and at least one ethylenic unsaturated monomer of an unsaturated carboxylic acid alkyl ester monomer, a (meth)acrylic acid monomer, and/or an unsaturated carboxylic acid amide monomer, and a polymerization initiator in a system in which the copolymer (A) prepared by the above method is dispersed, and the method may be repeated one or more times.

The preparation apparatus, polymerization initiator, water, and dispersing agent, chain transfer agent, and pH adjusting agent, if necessary or desired, as in the case of forming the copolymer (B) may be the same as in the case of preparing the copolymer (A).

2. Negative Electrode

The negative electrode for a rechargeable battery according to an embodiment includes the aforementioned binder for the non-aqueous electrolyte rechargeable battery and a negative active material.

The negative active material includes an active material including silicon atoms.

The content (e.g., amount or weight) of the binder for the non-aqueous electrolyte rechargeable battery in the negative electrode for a rechargeable battery according to an embodiment is suitably or desirably greater than or equal to about 1 wt % and less than or equal to about 10 wt %, and, for example, greater than or equal to about 2 wt % and less than or equal to about 6 wt % based on 100 wt % of the negative electrode for a rechargeable battery. When the content (e.g., amount or weight) of the binder for the non-aqueous electrolyte rechargeable battery is greater than or equal to about 1 wt % based on 100 wt % of the negative electrode for a rechargeable battery, a negative electrode having excellent close contacting properties and capable of suppressing or reducing expansion of the negative electrode to have good cycle performance may be obtained.

On the other hand, when the content (e.g., amount or weight) of the binder for the non-aqueous electrolyte rechargeable battery is less than or equal to about 10 wt % based on 100 wt % of the negative electrode for the rechargeable battery, cycle performance of the battery may be improved without excessively increasing the electrode resistance. 2-1. Negative Active Material The negative active material may include, for example, graphite active material (e.g., artificial graphite, natural graphite, a mixture of artificial graphite and natural graphite, natural graphite coated with artificial graphite, etc.), a mixture of silicon, tin and/or their oxide fine particles with a graphite active material, fine particles of silicon and/or tin, an alloy of silicon and/or tin, titanium oxide compounds such as $Li_4Ti_5O_{12}$, lithium nitride, and the like.

The oxide of silicon is represented by $SiO_x$ ($0<x\leq2$).

Examples of the negative active material include lithium metal and the like, in addition to the above-mentioned compounds.

In the negative electrode slurry for a rechargeable battery of an embodiment, the negative active material may include an active material including a silicon atom.

Examples of the active material including the silicon atom may include silicon particulates, silicon oxide ($SiO_x$ ($0<x\leq2$)), a composite material of silicon oxide and conductive carbon, a composite material of silicon-containing material and conductive carbon, and an alloy including silicon (for example, an alloy material of silicon and aluminum).

The active material including the silicon atom may be included in an amount of greater than or equal to about 5 wt % and less than or equal to about 30 wt %, for example greater than or equal to about 10 wt % and less than or equal to about 20 wt %, based on 100 wt % of the negative active material.

In the negative electrode for a rechargeable battery according to an embodiment, the content (e.g., amount or weight) of the negative active material may be included in an amount of greater than or equal to about 90 wt % and less than or equal to about 99 wt %, for example greater than or equal to about 94 wt % and less than or equal to about 98 wt % based on 100 wt % of the negative electrode for a rechargeable battery. When the content of the negative active material is greater than or equal to about 94 wt % based on 100 wt % of the negative electrode for a rechargeable battery, the electrode resistance is not excessively increased, and a negative electrode having good cycle performance may be obtained. According to embodiments of the present disclosure, when the content of the negative active material is less than or equal to about 98 wt % based on 100 wt % of the negative electrode for a rechargeable battery, a negative electrode having excellent close contacting properties and good cycle performance may be obtained.

The negative electrode for a rechargeable battery according to an embodiment described above includes the binder for non-aqueous electrolyte rechargeable battery according to an embodiment and a negative active material. Thus, a negative electrode having improved cycle characteristics may be obtained while maintaining good close contacting properties.

3. Rechargeable Battery

Hereinafter, an example configuration of the lithium ion rechargeable battery 10 according to the above-described embodiment of the present disclosure is described with reference to the accompanying drawing.

The accompanying drawing is a side cross-sectional view schematically showing a configuration of a lithium ion rechargeable battery according to an embodiment of the present disclosure.

The lithium ion rechargeable battery 10 includes a negative electrode 30 as an electrode for a rechargeable battery according to an embodiment of the present disclosure.

The lithium ion rechargeable battery 10 shown in the accompanying drawing is an example of a rechargeable battery according to an embodiment.

As shown in the accompanying drawing, the lithium ion rechargeable battery 10 includes a positive electrode 20, a negative electrode 30, a separator 40, and a non-aqueous electrolyte.

The charge reaching voltage (redox potential) of the lithium ion rechargeable battery 10 may be, for example, greater than or equal to about 4.0 V (vs. Li/Li+) and less than or equal to about 5.0 V, or greater than or equal to about 4.2 V and less than or equal to about 5.0 V.

The shape of the non-aqueous electrolyte rechargeable battery 10 is not particularly limited, but it may be for example, cylindrical, prismatic, laminate-type, or button-type, and/or the like.

3-1. Positive Electrode

The positive electrode 20 includes a current collector 21 and a positive active material layer 22. The current collector 21 may be any suitable conductor as long as it is a conductor (e.g., is suitably electrically conductive), and may be, for example, aluminum, stainless steel, nickel coated steel, and/or the like.

The positive active material layer 22 may include a positive active material, and optionally further include a conductive agent and a positive electrode binder. The positive active material is not particularly limited as long as it is a solid solution oxide including lithium such as, for example, a material capable of electrochemically intercalating and deintercalating lithium ions. The solid solution oxide may include, for example, $Li_aMn_xCo_yNi_zO_2$ ($1.15 \leq a \leq 1.43$, $0.45 \leq x \leq 0.6$, $0.10 \leq y \leq 0.15$, and $0.20 \leq z \leq 28$), $LiMn_xCo_yNi_zO_2$ ($0.3 \leq x \leq 85$, $0.10 \leq y \leq 0.3$, and $0.10 \leq z \leq 3$), $LiMn_{1.5}Ni_{0.5}O_4$, and the like.

Examples of the conductive agent may include, for example, carbon black such as ketjen black or acetylene black, natural graphite, artificial graphite, etc., but is not particularly limited as long as it is intended to increase the conductivity (e.g., electrical conductivity) of the positive electrode.

Examples of the positive electrode binder may include, for example, polyvinylidene fluoride, an ethylene-propylene-diene terpolymer, a styrene-butadiene rubber, an acrylonitrile-butadiene rubber, a fluororubber, polyvinyl acetate, polymethylmethacrylate, polyethylene, nitrocellulose, and the like. It is not particularly limited as long as it binds the positive active material, and conductive agent on the current collector 21.

The positive active material layer 22 may be produced, for example, by the following example method of production. The positive active material, the conductive agent, and the positive electrode binder are dry-mixed to prepare a positive electrode material mixture. Subsequently, the positive electrode material mixture is dispersed in a suitable organic solvent to prepare a positive electrode material mixture slurry, and the prepared positive electrode material mixture slurry is coated on the current collector 21, dried and compressed to produce a positive active material layer.

3-2. Negative Electrode

The negative electrode 30 includes a current collector 31 and a negative active material layer 32. The current collector 31 may be any suitable material as long as it is a conductor (e.g., is suitably electrically conductive), and examples thereof may include aluminum, stainless steel, and nickel-plated steel. The negative active material layer 32 may include the negative electrode material mixture for rechargeable battery described above.

The negative active material layer 32 includes the above-described the binder for the non-aqueous electrolyte rechargeable battery and a negative active material.

3-3. Separator

The separator 40 is not particularly limited as long as it is used as a separator for a lithium ion rechargeable battery. As the separator, it is desirable to use a porous film, nonwoven fabric, and/or the like which exhibits improved high-rate discharge performance, and they may be used alone or in combination. A resin constituting (e.g., for forming) the separator may include, for example, a polyolefin-based resin such as polyethylene and/or polypropylene, a polyester resin such as polyethylene terephthalate and/or polybutylene terephthalate, polyvinylidene fluoride, a vinylidene fluoride-hexafluoro propylene copolymer, a vinylidene fluoride-perfluoro vinylether copolymer, a vinylidene fluoride-tetrafluoroethylene copolymer, a vinylidene fluoride-trifluoro ethylene copolymer, a vinylidene fluoride-fluoro ethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and/or the like.

According to embodiments of the disclosure, the porosity of the separator is not particularly limited and is suitable or appropriate as long as it has any suitable porosity of a separator and may be any suitable separator generally used in a lithium ion rechargeable battery.

3-4. Non-Aqueous Electrolyte

The non-aqueous electrolyte is not particularly limited as long as it is a suitable non-aqueous electrolyte and may be any suitable non-aqueous electrolyte generally used in a lithium ion rechargeable battery. The non-aqueous electrolyte may include an electrolyte salt in a non-aqueous solvent.

Examples of the non-aqueous solvent may include cyclic carbonate esters such as propylene carbonate, ethylene carbonate, butylene carbonate, chloroethylene carbonate, and vinylene carbonate, cyclic esters such as γ-butyrolactone, γ-valerolactone, chain carbonates such as dimethylcarbonate, diethyl carbonate, and ethylmethyl carbonate, chain esters such as methyl formate, methyl acetate, and methyl butyrate, tetrahydrofuran or derivatives thereof, ethers such as 1,3-dioxane, 1,4-dioxane, 1,2-dimethoxyethane, 1,4-dibutoxyethane, and methyl diglyme, nitriles such as acetonitrile or benzonitrile, dioxolane or derivatives thereof, ethylene sulfide, sulfolane, sulfone or derivatives thereof. The foregoing may be used alone or in combination of two or more.

In embodiments of the disclosure, when two or more types of non-aqueous solvents are mixed and used, a mixing ratio of each solvent may be any suitable mixing ratio generally used in a lithium ion rechargeable battery.

Examples of the electrolyte salt may include, for example, an inorganic ionic salt including one of lithium (Li), sodium (Na), or potassium (K) such as $LiClO_4$, $LiBF_4$, $LiAsF_6$, $LiPF_6$, $LiPF_{6-x}(CnF_{2n+1})_x$ ($1<x<6$, $n=1$ or $2$), $LiSCN$, $LiBr$, $LiI$, $Li_2SO_4$, $Li_2B_{10}Cl_{10}$, $NaClO_4$, $NaI$, $NaSCN$, $NaBr$, $KClO_4$, or $KSCN$, $LiCF_3SO_3$, $LiN(CF_3SO_2)_2$, $LiN(C_2F_5SO_2)_2$, $Li[(CF_3SO_2)(C_4F_9SO_2)N]$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, organic ionic salts such as $(C_2H_5)_4N$-maleate, $(C_2H_5)_4N$-benzoate, $(C_2H_5)_4N$-phthalate, lithium stearyl sulfonate, lithium octyl sulfonate, or lithium dodecyl benzenesulfonate. The foregoing ionic compounds may be used alone or in combination of two or more.

The concentration of the electrolyte salt may be any suitable concentration used in a non-aqueous electrolyte used in a lithium ion rechargeable battery, and is not particularly limited. In an embodiment, a non-aqueous electrolyte in which a suitable lithium compound (electrolyte salt) is dissolved at a concentration of about 0.8 mol/L to about 1.5 mol/L may be used.

In some embodiments, the non-aqueous electrolyte may further include various additives. Examples of the additives include a negative electrode working additive, a positive electrode working additive, an ester-based additive, a carbonate ester-based additive, a sulfuric acid ester-based additive, a phosphoric acid ester-based additive, a boric acid ester-based additive, an acid anhydride-based additive, and an electrolyte-based additive. The aforementioned additives may be added to the non-aqueous electrolyte alone or in combination.

The lithium ion rechargeable battery 10 according to the embodiment described above uses the binder for the non-aqueous electrolyte rechargeable battery according to an embodiment when manufacturing the negative electrode 30.

Accordingly, by including the binder in a small amount in the negative electrode material mixture for a rechargeable battery, an increase in the layer thickness of the negative active material layer 32 may be suppressed or reduced.

4. Method of Manufacturing Lithium Ion Rechargeable Battery

Next, an embodiment of a method of manufacturing the lithium ion rechargeable battery 10 is described.

The positive electrode 20 may be produced as follows. First, a mixture of the positive active material, the conductive agent, and the positive electrode binder is dispersed in a solvent (e.g., N-methyl-2-pyrrolidone) to form a positive electrode slurry. Subsequently, the positive electrode slurry is coated on the current collector 21 and dried to form the positive active material layer 22. The coating method is not particularly limited. For example, a knife coater method, a gravure coater method, and/or the like may be used. Each of the following coating processes may also be performed by the same or substantially the same method. Subsequently, the positive active material layer 22 is pressed to have a suitable density using a press machine. Thus, the positive electrode 20 is produced.

The negative electrode 30 is also manufactured in the same or substantially the same way as the positive electrode 20. First, the negative electrode material mixture for a rechargeable battery described above is dispersed in a solvent (e.g., water) to form a negative electrode slurry. Subsequently, the prepared negative electrode slurry is coated on the current collector 31 and dried to form the negative active material layer 32. The drying temperature is desirably greater than or equal to about 150° C. Next, the negative active material layer 32 is pressed to have a suitable density by a press machine. Thus, the negative electrode 30 is produced.

Next, the separator 40 is placed between the positive electrode 20 and the negative electrode 30 to produce an electrode structure. Subsequently, the electrode structure is processed into a suitable or desired shape (e.g., a cylindrical shape, a square shape, a laminate shape, a button shape, etc.) and inserted into a container having the same or substantially the same shape. Then, the non-aqueous electrolyte is injected into the container to impregnate the pores in the separator 40 with the electrolyte. Thus, a lithium ion rechargeable battery is produced.

As described above, the binder for the non-aqueous electrolyte rechargeable battery according to an embodiment includes the copolymer (A) including the unit derived from the (meth)acrylic acid-based monomer and the unit derived from the (meth)acrylonitrile monomer, as a polymer dispersion stabilizer and the copolymer (B) including the unit derived from an aromatic vinyl-based monomer and the unit derived from an ethylenic unsaturated monomer as water-insoluble dispersion particles in the presence of the polymer dispersion stabilizer in water.

Even if the binder for the non-aqueous electrolyte rechargeable battery is used in a small amount (e.g., in an amount greater than or equal to about 1 wt % and less than or equal to about 10 wt % based on 100 wt % of the negative electrode for a rechargeable battery), it is possible to obtain a negative electrode having good close contacting properties and suppressing or reducing expansion of the negative electrode and having excellent cycle characteristics.

Hereinafter, embodiments of the present disclosure will be described in more detail with respect to certain examples. However, the following examples are only embodiments of the present disclosure, and it will be appreciated by those skilled in the art that the present disclosure is not limited to the following examples.

Example 1

Synthesis of Lithium Ion Negative Electrode for Rechargeable Battery Binder Synthesis of Water-Soluble Copolymer a 44.0 g of acrylic acid, 55.0 g of acrylonitrile, 1.0 g of 2-hydroxyethyl acrylate, 0.25 g of N,N'-methylenebisacrylamide, 122.1 mL of a 4 mol/L sodium hydroxide aqueous solution, and 757.9 g of ion exchange water were put in a 2000 mL separable flask equipped with a mechanical stirrer, a stirring bar, and a thermometer and then, stirred at 450 rpm, substituted with nitrogen inside a system, and heated by setting a jacket temperature at 85° C. When the temperature in the system was 60° C., an initiator aqueous solution prepared by dissolving 1194 mg of 2,2"-azobis(2-methyl-N-2-hydroxyethylpropionamide) in 20.0 g of ion exchange water was added thereto. While the jacket temperature was set at 85° C., the initiator aqueous solution was added thereto and then, stirred for 12 hours to obtain a light yellow polymer aqueous solution. After a reaction, an amount of non-volatile components in the polymer aqueous solution was 9.8 wt %.

Subsequently, the reaction solution was concentrated under reduced pressure distillation to remove non-reaction monomers, ammonia and ion exchange water were added thereto, and a solid concentration and pH of the polymer aqueous solution were adjusted, obtaining an aqueous solution of a water-soluble copolymer a, which contained 7 wt % of the polymer and had a pH 7.5.

Synthesis of Water-Dispersible Copolymer A 571.4 g of the aqueous solution of the water-soluble copolymer a (solid content: 7 wt %, pH: 7.5), 5.0 g of styrene, 2.5 g of 2-ethylhexyl acrylate, 2.5 g of 2-hydroxyethyl acrylate, and 127.9 g of ion exchange water were put in a 2000 mL separable flask equipped with a mechanical stirrer, a stirring bar, and a thermometer and then, stirred at 600 rpm, substituted with nitrogen in a system, and heated by setting a jacket temperature at 80° C. When the temperature in the system was 60° C., an initiator aqueous solution prepared by dissolving 98 mg of ammonium persulfate in 5.0 g of ion exchange water was added thereto. While the jacket temperature was set at 80° C., the initiator aqueous solution was added thereto and continuously stirred for 12 hours to obtain milk white water dispersion. After a reaction, an amount of non-volatile components of the water dispersion was 6.9 wt %.

Subsequently, the reaction solution was heated and concentrated under reduced pressure distillation to remove nonreaction monomers, and then ammonia and ion exchange water were added thereto, a solid concentration and pH of the water-dispersible copolymer A were adjusted to obtain dispersion of the water-dispersible copolymer A, which contained 7 wt % of the water-dispersible copolymer A and had a pH 7.5.

Manufacture of Lithium Ion Rechargeable Battery Cell
Manufacture of Negative Electrode A silicon-graphite composite active material (silicon content: 60 wt %), an artificial graphite active material, and the water-dispersible copolymer A in a solid weight ratio 14.55: 82.45:3.0 were dispersed in a water solvent to a prepare negative electrode material mixture slurry.

Subsequently, the negative electrode material mixture slurry was coated on both of the surfaces of a copper foil to have a coating amount (surface density) of 20.2 mg/cm$^2$ on both surfaces after the drying and then, compressed with a roll presser to have a mixture density of 1.65 g/cc and thus manufacture a negative electrode (a double-sided negative electrode).

Manufacture of Positive Electrode $Li_{1.0}Ni_{0.88}Co_{0.1}Al_{0.01}Mg_{0.01}O_2$, acetylene black, and polyvinylidene fluoride in a solid weight ratio of 97.7:1.0: 1.3 were dispersed in an N-methyl-2-pyrrolidone solvent to prepare a positive electrode material mixture slurry.

Subsequently, the positive electrode material mixture slurry was coated to have a mixture coating amount (surface density) of 20.0 mg/cm$^2$ on a single surface of an aluminum foil after the drying and then, compressed with a roll presser to have mixture density of 3.65 g/cc and thus manufacture a positive electrode (a single-sided positive electrode electrode).

Manufacture of Rechargeable Battery Cell

The double-sided negative electrode and the single-sided positive electrode were respectively welded with a nickel and aluminum lead wire, and then, an electrode stack structure was formed by interposing a polyethylene porous separator therebetween and inserting one sheet of the double-sided negative electrode between two sheets of the single-sided positive electrodes.

Subsequently, the electrode stack structure was housed inside an aluminum laminate film while the lead wires were drawn outside of the aluminum laminate film, and an electrolyte solution was injected thereinto and then, sealed under a reduced pressure to manufacture a rechargeable battery cell before an initial charge.

The electrolyte solution was prepared by dissolving 1 M of $LiPF_6$ and 1 wt % of vinylene carbonate in a mixed solvent of ethylene carbonate/dimethyl carbonate (at a volume ratio=3:7).

Manufacture of Metal Lithium Counter Electrode Cell

A metal lithium counter electrode cell before an initial charge was manufactured according to substantially the same method as Example 1 except that the single-sided positive electrode was replaced with a metallic lithium-bonded copper foil.

Example 2

A water-soluble copolymer b, a water-dispersible copolymer B, a negative electrode, and a rechargeable battery cell were manufactured according to substantially the same method as Example 1 except that 49.0 g of acrylic acid, 50.0 g of acrylonitrile, 1.0 g of 2-hydroxyethyl acrylate, 0.3 g of N,N'-methylenebisacrylamide, 136.0 mL of a 4 mol/L sodium hydroxide aqueous solution, and 744.0 g of ion exchange were used in place of the respective reactants in the synthesis of the water-soluble copolymer a of Example 1.

Example 3

A water-soluble copolymer c, a water-dispersible copolymer C, a negative electrode, and a rechargeable battery cell were manufactured according to substantially the same method as Example 1 except that 59.0 g of acrylic acid, 40.0 g of acrylonitrile, 1.0 g of 2-hydroxyethyl acrylate, 0.4 g of N,N'-methylenebisacrylamide, 163.8 mL of a 4 mol/L sodium hydroxide aqueous solution, and 716.2 g of ion exchange were used in place of the respective reactants in the synthesis of the water-soluble copolymer a of Example 1.

Example 4

A water-soluble copolymer d, a water-dispersible copolymer D, a negative electrode, and a rechargeable battery cell were manufactured according to substantially the same method as Example 2 except that 7.0 g of styrene, 1.5 g of 2-ethylhexyl acrylate, and 1.5 g of 2-hydroxyethyl acrylate were used in place of the respective reactants in the synthesis of the water-dispersible copolymer B of Example 2.

Example 5

A water-soluble copolymer e, a water-dispersible copolymer E, a negative electrode, and a rechargeable battery cell were manufactured according to substantially the same method as Example 2 except that 5.0 g of styrene, 3.0 g of 2-ethylhexyl acrylate, and 2.0 g of acrylonitrile were used in place of the respective reactants in the synthesis of the water-dispersible copolymer B of Example 2.

Example 6

A negative electrode and a rechargeable battery cell were manufactured according to substantially the same method as Example 1 except that the water-soluble copolymer a was used in addition to the water-dispersible copolymer A, and a silicon-graphite composite active material (silicon content: 60 wt %), an artificial graphite active material, the water-dispersible copolymer A, and the water-soluble copolymer were used in a solid weight ratio of 14.55:82.45:1.5:1.5 according to the preparation of the negative electrode material mixture slurry of Example 1.

Example 7

A negative electrode and a rechargeable battery cell were manufactured according to substantially the same method as Example 2 except that the water-soluble copolymer b was used in addition to the water-dispersible copolymer B, and a silicon-graphite composite active material (a silicon content: 60 wt %), an artificial graphite active material, the water-dispersible copolymer B, and the water-soluble copolymer b were used in a solid weight ratio of 14.55:82.45: 1.5:1.5 according to the preparation of the negative electrode material mixture slurry of Example 1.

Example 8

A negative electrode and a rechargeable battery cell were manufactured according to substantially the same method as Example 3 except that the water-soluble copolymer c was used in addition to the water-dispersible copolymer C, and a silicon-graphite composite active material (silicon content: 60 wt %), an artificial graphite active material, the water-dispersible copolymer C, and the water-soluble copolymer c were used in a solid weight ratio of 14.55:82.45:1.5:1.5 according to the preparation of the negative electrode material mixture slurry of Example 3.

Example 9

A water-soluble copolymer f, a water-dispersible copolymer F, a negative electrode, and a rechargeable battery cell were manufactured according to substantially the same method as Example 1 except that 75.0 g of acrylic acid, 75.0 g of acrylonitrile, 208.2 mL of a 4 mol/L sodium hydroxide aqueous solution, and 641.8 g of ion exchange water were used in place of the respective reactants in the synthesis of the water-soluble copolymer A of Example 1.

Example 10

A water-soluble copolymer g, a water-dispersible copolymer G, a negative electrode, and a rechargeable battery cell were manufactured according to substantially the same method as Example 1 except that 90.0 g of acrylic acid, 60.0 g of acrylonitrile, 249.8 mL of a 4 mol/L sodium hydroxide aqueous solution, and 600.2 g of ion exchange water were used in place of the respective reactants in the synthesis of the water-soluble copolymer A of Example 1.

Example 11

A water-soluble copolymer h, a water-dispersible copolymer H, a negative electrode, and a rechargeable battery cell were manufactured according to substantially the same method as Example 2 except that 6.0 g of styrene and 4.0 g of 2-ethylhexyl acrylate were used in place of the respective reactants in the synthesis of the water-dispersible copolymer B of Example 2.

Comparative Example 1

A negative electrode material mixture slurry was prepared according to substantially the same method as Example 1 except that the water-soluble copolymer a was used instead of the water-dispersible copolymer A, and then, the negative electrode material mixture slurry was coated on a copper foil and dried, but a negative electrode material mixture layer was cracked during the coating and the drying, and accordingly, a negative electrode used in the subsequent evaluation was not manufactured.

Comparative Example 2

A negative electrode material mixture slurry was prepared according to substantially the same method as Example 3 except that the water-soluble copolymer c was used instead of the water-dispersible copolymer C, and then, the negative electrode material mixture slurry was coated and dried on a copper foil, but a negative electrode material mixture layer was cracked during the coating and the drying, and accordingly, a negative electrode used in the subsequent evaluation was not manufactured.

Comparative Example 3

A water-soluble copolymer i was synthesized according to substantially the same method as Example 1 except that 79.0 g of acrylic acid, 20.0 g of acrylonitrile, 1.0 g of 2-hydroxyethyl acrylate, 0.5 g of N,N'-methylenebisacrylamide, 219.3 mL of a 4 mol/L sodium hydroxide aqueous solution, and 660.7 g of ion exchange water were used in place of the respective reactants in the synthesis of the water-soluble copolymer A of Example 1.

A negative electrode material mixture slurry was prepared according to substantially the same method as Example 1 except that the water-soluble copolymer i was used instead of the water-dispersible copolymer A, and the prepared negative electrode material mixture slurry was coated and dried on a copper foil, but a negative electrode material mixture layer was cracked during the coating and the drying, and accordingly, a negative electrode used in the subsequent evaluation was not manufactured.

Comparative Example 4

A water-soluble copolymer j was synthesized according to substantially the same method as Example 1 except that 99.0 g of acrylic acid, 1.0 g of 2-hydroxyethyl acrylate, 0.6 g of N,N'-methylenebisacrylamide, 274.8 mL of a 4 mol/L sodium hydroxide aqueous solution, and 605.2 g of ion exchange water were used in the synthesis of the water-soluble copolymer of Example 1.

A negative electrode material mixture slurry was prepared according to substantially the same method as Example 1 except that the water-soluble copolymer j was used instead of the water-dispersible copolymer A, and the negative electrode material mixture slurry was coated on a copper foil and dried to obtain a negative electrode material mixture layer. However, the negative electrode material mixture layer was cracked during the coating and the drying, and accordingly, a negative electrode used in the subsequent evaluation was not manufactured.

Comparative Example 5

A water-dispersible copolymer K, a negative electrode, and a rechargeable battery cell were prepared according to substantially the same method as Example 1 except that 69.0 g of acrylic acid, 30.0 g of acrylonitrile, 1.0 g of 2-hydroxyethyl acrylate, 0.4 g of N,N'-methylenebisacrylamide, 191.5 mL of a 4 mol/L sodium hydroxide aqueous solution, and 688.5 g of ion exchange water were used in place of the respective reactants in the synthesis of the water-soluble copolymer A of Example 1.

Comparative Example 6

A water-dispersible copolymer L, a negative electrode, and a rechargeable battery cell were manufactured according to substantially the same method as Example 1 except that 79.0 g of acrylic acid, 20.0 g of acrylonitrile, 1.0 g of 2-hydroxyethyl acrylate, 0.5 g of N,N'-methylenebisacrylamide, 219.3 mL of a 4 mol/L sodium hydroxide aqueous solution, and 660.7 g of ion exchange water were used in place of the respective reactants in the synthesis of the water-soluble copolymer A of Example 1.

Comparative Example 7

A water-dispersible copolymer M, a negative electrode, and a rechargeable battery cell were manufactured according to substantially the same method as Example 2 except that N,N'-methylenebisacrylamide was not injected in the synthesis of the water-soluble copolymer B of Example 2.

Comparative Example 8

A water-dispersible copolymer N, a negative electrode, and a rechargeable battery cell were manufactured according to substantially the same method as Example 2 except that 0.8 g of N,N'-methylenebisacrylamide was used in place of the respective reactants in the synthesis of the water-soluble copolymer B of Example 2.

Comparative Example 9

A water-dispersible copolymer 0, a negative electrode, and a rechargeable battery cell were manufactured according to substantially the same method as Example 2 except that 3.0 g of styrene, 6.5 g of 2-ethylhexyl acrylate, and 0.5 g of 2-hydroxyethyl acrylate were used in place of the respective reactants in the synthesis of the water-dispersible copolymer B of Example 2.

Comparative Example 10

A water-dispersible copolymer P, a negative electrode, and a rechargeable battery cell were manufactured according to substantially the same method as Example 2 except that 3.0 g of styrene, 6.5 g of N-butyl acrylate, and 0.5 g of 2-hydroxyethyl acrylate were used in place of the respective reactants in the synthesis of the water-dispersible copolymer B of Example 2.

Comparative Example 11

A water-dispersible copolymer P, a negative electrode, and a rechargeable battery cell were manufactured according to substantially the same method as Example 1 except that a sodium salt (CMC) of carboxylmethyl cellulose and a modified styrene butadiene copolymer (SBR) were used together instead of the water-dispersible copolymer A in the preparation of the negative electrode material mixture slurry of Example 1, and a silicon-graphite composite active material (a silicon content: 60 wt %), an artificial graphite active material, CMC, and SBR were used in a solid weight ratio of 14.55:82.45:1.0:2.0.

Comparative Example 12

Among Examples of International Publication No. 2014/207967, aqueous solutions of a copolymer of vinyl alcohol and sodium acrylate according to Preparation Examples 1 and 2 were synthesized (a copolymerization composition ratio of sodium acrylate and vinyl alcohol was a mole ratio of 6:4).

A negative electrode and a rechargeable battery cell were manufactured according to substantially the same method as Example 1 except that a copolymer of sodium acrylate and vinyl alcohol was used instead of the water-dispersible copolymer A in the preparation of the negative electrode material mixture slurry of Example 1.

Evaluation of Binder, Negative Electrode Material Mixture Slurry, Negative Electrode, and Rechargeable Battery Cell
Glass Transition Temperature (Tg)

The water-dispersible copolymers according to Examples 1 to 5 and 9 to 11 and Comparative Examples 5 to 10 were analyzed by using differential scanning calorimetry (DSC) by the measuring method of JIS K 7121, and one endothermic peak was observed in a range of 150° C. to 250° C. or higher, and one endothermic peak was observed at 100° C. or lower. When the water-soluble copolymers used for the synthesis of the water-dispersible copolymers were equally analyzed, one endothermic peak was found at 150° C. to 250° C. or higher. Accordingly, in the analysis of the water-dispersible copolymers, a temperature of the endothermic peak at 100° C. or lower was regarded as Tg caused from water insoluble disperse particles.

Viscosity

In the aqueous solutions of the water-soluble copolymers of Examples 1 to 5 and 9 to 11 and Comparative Examples 5 to 10, viscosity of the water-dispersible copolymer dispersions having a solid content of 7 wt % was measured at 25° C. In addition, in the aqueous solutions of the water-soluble copolymers of Examples 1 to 11 and Comparative Examples 1 to 10, viscosity of the water-soluble copolymer dispersions having a solid content of 7 wt % was measured at 25° C. (by the measuring method of JIS K 7117).

Coating Suitability

In respectively coating and drying the negative electrode material mixture slurries according to Examples 1 to 11 and Comparative Examples 1 to 12 on a copper foil, the negative electrode material mixture layers were examined for cracks to evaluate coating suitability.

The coating suitability evaluation was performed according to the following evaluation criteria.

0: No crack occurs x: Crack occurs

Close Contacting Properties

The negative electrodes of Examples 1 to 11 and Comparative Examples 5 to 12 were cut into rectangular shaped samples having a width of 25 mm and a length of 100 mm. Subsequently, the active material side of the cut negative electrode was adhered to a stainless steel plate using a double-sided adhesive tape to obtain samples for evaluating close contacting properties. Subsequently, the samples were respectively mounted on a peel tester (SHIMAZU EZ-S, Shimadzu Corp.) and measured with respect to 180° peel strength.

Negative Electrode Expansion Ratio after First Charge

Metal lithium counter electrode cells according to Examples 1 to 11 and Comparative Examples 5 to 12 were constant current-charged up to 0.005 V with 0.1 CA of design capacity (1 CA=1 hour discharge rate) in a 25° C. thermostat and subsequently, constant voltage-charged up to 0.01 CA at 0.005 V. Subsequently, the battery cells were disassembled to take out the negative electrodes, thicknesses of the negative electrodes were measured at a micrometer level and then, compared with thickness of the negative electrode before the first charge to evaluate a negative electrode expansion ratio after the first charge.

Herein, the negative electrode expansion ratio was calculated according to [(negative electrode thickness after the charge−negative electrode thickness before the charge)/the negative electrode thickness before the charge]×100.

Peeling of Negative Electrode Material Mixture Layer after First Charge

In the evaluation of the negative electrode expansion ratio after first charge, the negative electrodes taken out after the first charge were visually examined without visual assistance and evaluated as follows.

0: No peel of negative electrode material mixture layer from copper foil

Δ: Partial peel of negative electrode material mixture layer from copper foil x: Entire peel of negative electrode material mixture layer from copper foil Cycle Characteristics The rechargeable battery cells of Examples 1 to 11 and Comparative Examples 5 to 12 were respectively constant current-charged up to 4.3 V with 0.1 CA of design capacity in a 25° C. thermostat and subsequently, constant voltage-charged to 0.05 CA at 4.3 V. Then, the cells were constant current-discharged down to 2.5 V at 0.1 CA.

Subsequently, the cells were constant current-charged at 0.2 CA, constant voltage-charged at 0.05 CA, and constant current-discharged at 0.2 CA under a condition of a charge cut-off voltage of 4.3 V and a discharge cut-off voltage of 2.5 V in the 25° C. thermostat, which was regarded as one cycle, and thus measured with respect to initial discharge capacity.

Subsequently, the rechargeable battery cells were constant current-charged at 0.5 CA, constant voltage-charged at 0.05 CA, constant current-discharged at 0.5 CA at a 25° C. under a condition of a charge cut-off voltage of 4.3 V and under a discharge cut-off voltage of 2.5 V, which was 100 cycles repeated for a cycle-life test.

Then, after the 100 cycles, the cells were constant current-charged at 0.2 CA, constant voltage-charged at 0.05 CA, and discharged at 0.2 CA to measure discharge capacity, and then, the discharge capacity was divided by the initial discharge capacity to obtain capacity retention after the 100 cycles.

Evaluation Results

The polymer compositions used in Examples 1 to 5 and 9 to 11 and Comparative Examples 1 to 10 are shown in Table 1.

In addition, the evaluation results of examples and comparative examples are shown in Table 2.

TABLE 1

| | Negative electrode binder | Water-soluble copolymer component supply ratio (sum 100 wt %) | | | Water-dispersible (water-insoluble) dispersion particle component supply ratio (sum 100 wt %) | | | | | Viscosity [mPa · s] | | Tg of dispersion particle component [° C.] |
|---|---|---|---|---|---|---|---|---|---|---|---|---|
| | | AA [wt %] | AN [wt %] | Other component [wt %] | St [wt %] | 2-EHA [wt %] | HEA [wt %] | AN [wt %] | BA [wt %] | Water-soluble copolymer | Water-dispersible copolymer | |
| Ex. 1 | Water-dispersible copolymer A | 43.9 | 54.8 | 1.3 | 50 | 25 | 25 | 0 | 0 | 1200 | 1120 | 45 |
| Ex. 2 | Water-dispersible copolymer B | 48.7 | 50 | 1.3 | 50 | 25 | 25 | 0 | 0 | 1050 | 980 | 45 |
| Ex. 3 | Water-dispersible copolymer C | 58.6 | 40 | 1.4 | 50 | 25 | 25 | 0 | 0 | 1000 | 950 | 45 |
| Ex. 4 | Water-dispersible copolymer D | 48.7 | 50 | 1.3 | 70 | 15 | 15 | 0 | 0 | 1050 | 960 | 70 |
| Ex. 5 | Water-dispersible copolymer E | 48.7 | 50 | 1.3 | 50 | 30 | 0 | 20 | 0 | 1050 | 990 | 55 |
| Ex. 9 | Water-dispersible copolymer F | 50 | 50 | 0 | 50 | 25 | 25 | 0 | 0 | 1110 | 1090 | 45 |
| Ex. 10 | Water-dispersible copolymer G | 60 | 40 | 0 | 50 | 25 | 25 | 0 | 0 | 1100 | 1080 | 45 |
| Ex. 11 | Water-dispersible copolymer H | 48.7 | 50 | 1.3 | 60 | 40 | 0 | 0 | 0 | 1050 | 950 | 38 |
| Comp. Ex. 1 | Water-soluble copolymer a | 43.9 | 54.8 | 1.3 | 0 | 0 | 0 | 0 | 0 | 1200 | — | — |
| Comp. Ex. 2 | Water-soluble copolymer c | 58.6 | 40 | 1.4 | 0 | 0 | 0 | 0 | 0 | 1000 | — | — |
| Comp. Ex. 3 | Water-soluble copolymer i | 78.5 | 20 | 1.5 | 0 | 0 | 0 | 0 | 0 | 1300 | — | — |
| Comp. Ex. 4 | Water-soluble copolymer j | 98.4 | 0 | 1.6 | 0 | 0 | 0 | 0 | 0 | 1250 | — | — |
| Comp. Ex. 5 | Water-dispersible copolymer K | 68.5 | 30 | 1.5 | 50 | 25 | 25 | 0 | 0 | 1100 | 1020 | 45 |
| Comp. Ex. 6 | Water-dispersible copolymer L | 78.5 | 20 | 1.5 | 50 | 25 | 25 | 0 | 0 | 1150 | 1060 | 45 |
| Comp. Ex. 7 | Water-dispersible copolymer M | 49 | 50 | 1.0 | 50 | 25 | 25 | 0 | 0 | 250 | 200 | 45 |
| Comp. Ex. 8 | Water-dispersible copolymer N | 48.2 | 50 | 1.8 | 50 | 25 | 25 | 0 | 0 | 12000 | 10900 | 45 |

TABLE 1-continued

| | Negative electrode binder | Water-soluble copolymer component supply ratio (sum 100 wt %) | | | Water-dispersible (water-insoluble) dispersion particle component supply ratio (sum 100 wt %) | | | | | Viscosity [mPa·s] | | Tg of dispersion particle component [° C.] |
|---|---|---|---|---|---|---|---|---|---|---|---|---|
| | | AA [wt %] | AN [wt %] | Other component [wt %] | St [wt %] | 2-EHA [wt %] | HEA [wt %] | AN [wt %] | BA [wt %] | Water-soluble copolymer | Water-dispersible copolymer | |
| Comp. Ex. 9 | Water-dispersible copolymer O | 48.7 | 50 | 1.3 | 30 | 65 | 5 | 0 | 0 | 1050 | 960 | −8 |
| Comp. Ex. 10 | Water-dispersible copolymer P | 48.7 | 50 | 1.3 | 30 | 0 | 5 | 0 | 65 | 1050 | 960 | 8 |

In Table 1, ⌈AA⌋ denotes acrylic acid, ⌈AN⌋ denotes acrylonitrile, ⌈other components⌋ denote a total sum of 2-hydroxyethyl acrylate and N,N'-methylenebisacrylamide injected to synthesize a water-soluble copolymer, ⌈St⌋ denotes styrene, ⌈2-EHA⌋ denotes 2-ethylhexyl acrylate, ⌈HEA⌋ denotes 2-hydroxyethyl acrylate, and ⌈BA⌋ denotes N-butyl acrylate.

TABLE 2

| | Negative electrode binder | Application suitability (crack generation) | Close contacting properties [gf/mm] | Negative electrode expansion ratio [%] after first charge | Peeling of negative electrode material mixture layer after first discharge | Capacity retention [%] after 100 cycles |
|---|---|---|---|---|---|---|
| Ex. 1 | Water-dispersible copolymer A | ○ | 1.5 | 30 | ○ | 84 |
| Ex. 2 | Water-dispersible copolymer B | ○ | 1.4 | 29 | ○ | 86 |
| Ex. 3 | Water-dispersible copolymer C | ○ | 1.1 | 30 | ○ | 85 |
| Ex. 4 | Water-dispersible copolymer D | ○ | 1.3 | 30 | ○ | 85 |
| Ex. 5 | Water-dispersible copolymer E | ○ | 1.2 | 33 | ○ | 84 |
| Ex. 6 | Water-dispersible copolymer A + water-soluble copolymer a | ○ | 1.5 | 30 | ○ | 85 |
| Ex. 7 | Water-dispersible copolymer B + water-soluble copolymer b | ○ | 1.4 | 29 | ○ | 87 |
| Ex. 8 | Water-dispersible copolymer C + water-soluble copolymer c | ○ | 1.1 | 30 | ○ | 85 |
| Ex. 9 | Water-dispersible copolymer F | ○ | 1.5 | 30 | ○ | 85 |

TABLE 2-continued

| | Negative electrode binder | Application suitability (crack generation) | Close contacting properties [gf/mm] | Negative electrode expansion ratio [%] after first charge | Peeling of negative electrode material mixture layer after first discharge | Capacity retention [%] after 100 cycles |
|---|---|---|---|---|---|---|
| Ex. 10 | Water-dispersible copolymer G | ○ | 1.1 | 30 | ○ | 85 |
| Ex. 11 | Water-dispersible copolymer H | ○ | 1.0 | 32 | ○ | 83 |
| Comp. Ex. 1 | Water-soluble copolymer a | x | No evaluation due to impossibility of manufacturing negative electrode plates | | | |
| Comp. Ex. 2 | Water-soluble copolymer c | x | | | | |
| Comp. Ex. 3 | Water-soluble copolymer i | x | | | | |
| Comp. Ex. 4 | Water-soluble copolymer j | x | | | | |
| Comp. Ex. 5 | Water-dispersible copolymer K | ○ | 0.6 | 37 | Δ | 79 |
| Comp. Ex. 6 | Water-dispersible copolymer L | ○ | 0.4 | 36 | Δ | 78 |
| Comp. Ex. 7 | Water-dispersible copolymer M | ○ | 0.7 | 35 | Δ | 79 |
| Comp. Ex. 8 | Water-dispersible copolymer N | ○ | 1.5 | 36 | Δ | 79 |
| Comp. Ex. 9 | Water-dispersible copolymer O | ○ | 1.3 | 45 | x | 76 |
| Comp. Ex. 10 | Water-dispersible copolymer P | ○ | 1.3 | 42 | x | 76 |
| Comp. Ex. 11 | CMC + SBR | ○ | 1.3 | 45 | Δ | 74 |
| Comp. Ex. 12 | Sodium acrylate-vinylalcohol copolymer | ○ | 1.1 | 30 | ○ | 79 |

First, in Comparative Examples 1 to 4 using an aqueous solution of a sodium polyacrylate copolymer in a negative electrode binder, the negative electrode material mixture slurries caused cracks in the negative electrode material mixture layers during the coating and drying and thus substantially failed in manufacturing negative electrodes. These results showed that polyacrylic acid had a high elastic modulus but because of insufficient flexibility, the negative electrode did not have sufficient flexibility due to the lack of flexibility of the binder.

Because Examples 1 to 11 and Comparative Examples 5 to 10 used dispersions of the water-dispersible copolymers synthesized by using a sodium polyacrylate copolymer aqueous solution as a dispersion stabilizer, the aforementioned crack problem was solved.

These results were believed to be obtained, because flexibility of the binders was improved by introducing particles having a lower elastic modulus but a larger fracture elongation than the sodium polyacrylate copolymer into the water-dispersible copolymers.

Subsequently, the binders of Examples 1 to 11 according to embodiments of the present disclosure exhibited excellent cycle characteristics as compared with the binders of Comparative Examples 5 to 10.

This result was believed to be obtained, because a copolymerization ratio of sodium acrylate and acrylonitrile of the water-soluble copolymers, a water-soluble shell component of the water-dispersible copolymers (comparing Examples 1 to 3 with Comparative Examples 5 and 6), viscosity of the water-dispersible copolymers and the water-soluble copolymers (comparing Example 2 with Comparative Examples 7 and 8), and Tg of hydrophobic copolymer particles used as a core component of the water-dispersible copolymers (comparing Examples 2, 4, and 5 with Comparative Examples 9 and 10) were appropriately designed, and accordingly, negative electrode expansion degrees after (first) charge and/or peeling of the negative electrode material mixture layers were suppressed.

In addition, the rechargeable battery cells according to Examples 1 to 11 exhibited more improved cycle performance than the rechargeable battery cell according to Comparative Example 11 including CMC and SBR, which are generally used as aqueous negative electrode binders for lithium ion rechargeable batteries, and the rechargeable battery cell according to Comparative Example 12 including a sodium acrylate-vinyl alcohol copolymer, which is a different sodium polyacrylate-based binder from the binder of the present disclosure.

Example embodiments of the present disclosure have been described with reference to the accompanying drawings, but the present disclosure is not limited to the examples.

It will be appreciated by those having ordinary skill in the technical field to which the present disclosure belongs, that various changes or modifications may be reached within the scope of the technical idea described in the claims, and equivalents thereof, and it is understood that such modifications and changes all within the spirit and technical scope of the present disclosure.

DESCRIPTION OF AT LEAST SOME OF THE SYMBOLS

10: lithium ion rechargeable battery
20: positive electrode
30: negative electrode
40: separator

What is claimed is:

1. A binder for a non-aqueous electrolyte rechargeable battery, comprising a copolymer (A) and a copolymer (B),
    the copolymer (A) comprises a unit (a-1) derived from a (meth)acrylic acid-based monomer, and a unit (a-2) derived from a (meth)acrylonitrile monomer, and
    the copolymer (B) comprises a unit (b-1) derived from an aromatic vinyl-based monomer; and a unit (b-2) derived from an ethylenic unsaturated monomer which is at least one of an unsaturated carboxylic acid alkylester monomer, a (meth)acrylic acid-based monomer, an unsaturated carboxylic acid amide monomer, or combinations thereof,
    wherein the unit (a-2) derived from a (meth)acrylonitrile monomer is included in an amount of about 35 wt % to about 65 wt %, based on 100 wt % of the copolymer (A).

2. The binder of claim 1, wherein the copolymer (A) further comprises a unit (a-3) derived from another monomer copolymerizable with the (meth)acrylic acid-based monomer and/or (meth)acrylonitrile monomer.

3. The binder of claim 1, wherein the unit (a-1) derived from the (meth)acrylic acid-based monomer is included in an amount of about 35 wt % to about 65 wt %.

4. The binder of claim 2, wherein the unit (a-3) derived from another monomer copolymerizable with the (meth)acrylic acid-based monomer and/or (meth)acrylonitrile monomer is included in an amount of greater than about 0 wt % and less than or equal to about 20 wt % based on 100 wt % of the copolymer (A).

5. The binder of claim 1, wherein the binder has a particle shape.

6. The binder of claim 1, wherein at least a portion of the copolymer (B) is surrounded by the copolymer (A).

7. The binder of claim 1, wherein the copolymer (A) is included in an amount of about 50 parts by weight to about 95 parts by weight based on 100 parts by weight of the copolymer (B).

8. The binder of claim 1, wherein the (meth)acrylic acid-based monomer is at least one of (meth)acrylic acid, an alkali metal salt of (meth)acrylic acid, an ammonium salt of (meth)acrylic acid, or combinations thereof.

9. The binder of claim 1, wherein when the copolymer (A) is present in an aqueous solution at a solid content of about 7 wt %, a viscosity of the aqueous solution is in a range of about 500 mPa·s to about 3000 mPa·s.

10. The binder of claim 1, wherein when the copolymer (B) is present in an aqueous solution at a solid content of about 7 wt %, a viscosity of the aqueous solution is in a range of about 500 mPa·s to about 3000 mPa·s.

11. The binder of claim 1, wherein the unit (b-2) derived from an ethylenic unsaturated monomer is included in an amount of greater than or equal to about 5 wt % based on 100 wt % of the copolymer (B).

12. The binder of claim 1, wherein the glass transition temperature of the copolymer (B) is in a range of about 15° C. to about 100° C.

13. A negative electrode slurry for a rechargeable battery comprising
    the binder for the non-aqueous electrolyte rechargeable battery of claim 1 and a negative active material, and
    the negative active material includes an active material comprising a silicon atom.

14. A negative electrode for a rechargeable battery, comprising
    a current collector; and a negative active material layer comprising the binder for the non-aqueous electrolyte rechargeable battery of claim 1 formed on the current collector.

15. A rechargeable battery comprising the negative electrode for the rechargeable battery of claim 14.

* * * * *